United States Patent
Leander

(10) Patent No.: US 12,019,418 B2
(45) Date of Patent: Jun. 25, 2024

(54) ACCESS CONTROL WITHIN A MODULAR AUTOMATION SYSTEM

(71) Applicant: ABB Schweiz AG, Baden (CH)

(72) Inventor: Björn Leander, Västerås (SE)

(73) Assignee: ABB Schweiz AG, Baden (CH)

( * ) Notice: Subject to any disclaimer, the term of this patent is extended or adjusted under 35 U.S.C. 154(b) by 541 days.

(21) Appl. No.: 17/231,682

(22) Filed: Apr. 15, 2021

(65) Prior Publication Data

US 2021/0341894 A1    Nov. 4, 2021

(30) Foreign Application Priority Data

Apr. 29, 2020 (EP) .................................. 20171980

(51) Int. Cl.
G05B 19/042   (2006.01)
G05B 19/048   (2006.01)

(52) U.S. Cl.
CPC ..... *G05B 19/0421* (2013.01); *G05B 19/0426* (2013.01); *G05B 19/048* (2013.01); *G05B 2219/13108* (2013.01); *G05B 2219/2222* (2013.01); *G05B 2219/2642* (2013.01)

(58) Field of Classification Search
CPC ............ G05B 19/0421; G05B 19/0426; G05B 19/048; G05B 2219/13108; G05B 2219/2222; G05B 2219/2642
USPC .......................................................... 700/19
See application file for complete search history.

(56) References Cited

U.S. PATENT DOCUMENTS

| | | | | |
|---|---|---|---|---|
| 5,265,005 A | * | 11/1993 | Schmidt | G05B 19/052 700/18 |
| 2004/0153171 A1 | * | 8/2004 | Brandt | G05B 15/02 700/9 |
| 2013/0090745 A1 | * | 4/2013 | Frazer | G05B 19/054 700/12 |
| 2013/0212160 A1 | * | 8/2013 | Lawson | G06F 16/9535 709/203 |

(Continued)

FOREIGN PATENT DOCUMENTS

CN    209505913 U    10/2019
EP        473086 A1    3/1992

(Continued)

OTHER PUBLICATIONS

Wael, Adi; Technical University of Braunschweig; "Mechatronic Security and Robot Authentication"; Symposium on Bio-inspired Learning and Intelligent Systems for Security; 2009; 6 Pages.

(Continued)

*Primary Examiner* — Md Azad
(74) *Attorney, Agent, or Firm* — Whitmyer IP Group LLC

(57) ABSTRACT

A method for managing access control within a modular automation system including at least two automation modules. Each automation module is associated with an operation or a set of operations for carrying out a specific task. The method includes: receiving a schema of a common process including at least the order of processing steps of the modular automation system, wherein each processing step includes one or more of the specific tasks of the automation modules; generating privilege associations for each processing step with one or more automation modules, based on the schema; and generating an access control policy for the automation modules based on the privilege associations.

16 Claims, 4 Drawing Sheets

(56) References Cited

U.S. PATENT DOCUMENTS

2016/0330222 A1* 11/2016 Brandt .................. G06N 5/047
2017/0126687 A1   5/2017 Martinelli
2019/0068582 A1   2/2019 Kim et al.
2019/0188045 A1*  6/2019 Vogt ......................... G06F 9/50

FOREIGN PATENT DOCUMENTS

EP      1414216 A2   4/2004
WO    2016041529 A1  3/2016

OTHER PUBLICATIONS

Yfantis, Evangelos A., et al.; University of Nevada; "Authentication and Secure Robot Communication"; International Journal of Advanced Robotic Systems, vol. 11, Issue: 2; Jan. 1, 2014; 6 Pages.
Extended European Search Report; Application No. 20171980.4; dated Oct. 10, 2020; 8 Pages.

* cited by examiner

ACCESS CONTROL WITHIN A MODULAR AUTOMATION SYSTEM

TECHNICAL FIELD

The present invention relates generally to access control. The invention more particularly relates to a method for managing access control within a modular automation system, and to an automation security system for a modular automation system.

BACKGROUND

With an increasing strain from the market, enterprises within the process industry are competing for profitable operations, trying at the same time to overcome challenges due to fluctuating demands, reduced time-to-market and shortened product life cycles. Modular automation is an emerging technology within the process automation industry, e.g., the chemical and pharmaceutical sectors, that promises to address some of these challenges.

Modular automation provides a manufacturing environment with flexibility e.g., in order to go from laboratory experiments into production with low cost and effort, the ability to scale production volumes up and down based on market demands, and to tailor products to customer specific requirements. The technique to enable modular automation is based on standardized autonomous modules, e.g., described as Module Type Packages (MTPs), that carry out specific tasks, e.g., a heater or distiller. These MTPs can be dynamically combined and recombined to perform different collaborative operations with a minimum engineering effort. Thus, the different modules within the modular automation system are typically highly heterogeneous and dynamic, with the ability to autonomously fulfill specific tasks, requiring only high-level engineering to combine and recombine the modules to execute a complete or overall production scheme. This allows a high level of customization and reuse of modules.

In this dynamic and flexible systems where communication paths are not predefined, and where production schemes are everchanging, it becomes difficult to detect malicious behavior. At the same time, the attack surface and complexity of the system is increasing, raising the risk of a legitimate module/device being compromised within such systems. A compromised module/device, controlled by a malicious actor, may cause a significant damage, not only economic for the factory owner, but also physical on e.g., humans, machinery, and the environment. The impact may be direct, e.g., the opening of a valve may overfill a tank or turning on heating in an empty reactor may cause a fire. Impact could also be indirect, e.g., changing ratios of materials used to produce a medicine may render it harmful. The direct causes are usually mitigated by implementations of secondary safety measures, while indirect causes may be more difficult to detect and mitigate.

There is thus a need in the industry for applying a strict and specific access control to the modules in a modular automation system.

SUMMARY

An object of the present invention is to overcome at least some of the above problems, and to provide an access control policy within a modular automation system which, at least to some extent, is improved compared to prior art solutions. This, and other objectives, which will become apparent in the following are accomplished by means of a method for managing access control within a modular automation system, and an automation security system for a modular automation system.

According to a first aspect of the present invention, a method for managing access control within a modular automation system is provided. The modular automation system includes at least two automation modules, wherein each automation module is associated with an operation or a set of operations for carrying out a specific task, the method comprising:

receiving a schema of a common process comprising at least the order of processing steps of the modular automation system, each processing step comprising one or more of the specific tasks of the automation modules;

generating privilege associations for each processing step with one or more automation modules, based on said schema;

generating an access control policy for the automation modules based on the privilege associations.

Hereby, each automation module is strictly controlled by an associated processing step, and thus actions outside of the active schema is prohibited. Based on the present access control policy (i.e., the rules of privileges), it is possible to grant only those privileges prescribed by the processing needs. In other words, access to operations or data is only allowed to privileged entities, and a restricted access control policy is provided. This enables reduced harm caused by a malicious actor in the system, as access to modules/devices/operations or data is only allowed to privileged entities, i.e., based on the privileged associations. Moreover, such restricted access control policy increases the visibility of a malicious actor, as denied access control requests are typically monitored e.g., using a Security Information and Event Monitoring (SIEM) system.

By using the processing steps of the modular automation system as basis for the access control policy to the automation modules, the risk, and associated impact, of a control takeover by a malicious actor can be reduced.

According to at least one example embodiment, the automation modules are simply referred to as modules within the modular automation system. Thus, modules and automation modules are used interchangeably throughout the application text. The term "automation" in the automation modules, is referring to the fact that each module has the ability to fulfill specific associated tasks, possibly independently of other modules in the modular automation system. The automation modules may e.g., a standardized autonomous modules, described e.g., as Module Type Packages, MTPs. An automation module may comprise one or more devices, and any auxiliary equipment needed for the device(s) to perform the operation, or set of operations, associated with the specific task of the particular automation module. In other words, each automation module is adapted to carry out the operation, or set of operations, associated with the corresponding specific task.

It should be understood that the at least two automation modules, when put together in the modular automation system, may operate together such that the specific tasks of the automation modules cooperate to provide the common process, (or overall process or overall sub-process). Such common process is typically defined or described by the various processing steps, wherein each processing step comprises one or more of the specific tasks of the automation modules. The order of such processing steps may be summarized in a schema (which may be referred to as a workflow description, protocol, or recipe). Stated differently, the execution of a workflow in modular automation system is described by the schema, with different processing steps comprising a set of specific tasks that one or more modules are configured to perform. Moreover, as more thorough described below but briefly mentioned here, the common process may be a sub-process, and part of an overall process of the modular automation system, wherein such overall process comprises a plurality of common processes carried out by various automation modules according to corresponding schemas. Furthermore, each automation module may be configured to carry out more than one specific task, i.e., the associated operation or a set of operations may be for carrying out a plurality of specific tasks.

According to at least one example embodiment, the privilege associations are generated privileges between each processing step and one or more of the automation modules. In other words, privileges, or rights to perform actions or access data, are generated by associations between each processing step and one or more of the automation modules needed to carry out the particular processing step. Moreover, by basing the privilege associations on the processing steps, control of the automation modules beyond the schema is not possible. The steps of generating privilege associations and generating an access control policy based on the privilege associations, may be referred to an automatic generation of an access control policy. Typically, if a schema is updated, the privilege associations associated with the updated schema are updated together with an update of the access control policy.

According to at least one example embodiment, the privilege associations comprise the specific task of the automation module in the corresponding processing step. For example, each privilege association may be built up by the particular processing step, the automation module(s) to be used during the processing step, and any associated specific task needed to fulfil the processing step. Alternatively, or stated differently, the generation of the access control policy comprises generating privilege associations between the processing steps and corresponding automation module by the corresponding specific task(s).

According to at least one example embodiment, the access control policy may be described as a set of rules or directions related to privileges, governing access control models.

According to at least one example embodiment, the modular automation system comprises a central operating unit configured to communicate with each one of the automation modules, wherein the method further comprises the step of:
executing the schema by the central operating unit in accordance with the generated access control policy.

Hereby, an efficient way of controlling the operation of the modular automation system is provided.

According to at least one example embodiment, the access control to the automation modules by the central operating unit is limited by the access control policy.

According to at least one example embodiment, the central operating unit is an orchestrator.

According to at least one example embodiment, the modular automation system comprises a plurality of interconnected automated modules, or a plurality of interconnected sub-sets of automated modules (e.g., each sub-set having at least two automated modules cooperating as previously described). Alternatively, or additionally, the modular automation system comprises a plurality of central operating units (or orchestrators), wherein each central operating unit is configured to executing the particular schema associated with corresponding automation modules in accordance with the generated access control policy. Hereby, the automated modules may be directed to perform their specific tasks at any given time.

Thus, a modular automation system may be comprised of a number of interconnected automation modules on a physical layer performing the actual processing, and a number of central operating units directing the automation modules on the specific tasks to perform at any given time. The actions to perform are thus described by the schema. The modular automation system may be operated according to a plurality of schemas. The activity of formulating a schema may be allocated to integration engineering, typically executed by an expert on the specific process described by the schema. Formulating the schema does not need direct access to a specific physical function of a module. The task of schema activation is allocated to operational engineering, typically being performed by an operator. This task includes designating which modules (and possibly the central operating unit) that will actually be used for production in the modular automation system.

According to at least one example embodiment, the same automation modules are configured to be operated by at least two different schemas. According to such embodiments, each automation module can typically only be operated according to one schema at a time.

According to at least one example embodiment, the access control policy for the automation modules is implemented into a policy data unit. According to such embodiments, the method may further comprise the step of accessing the access control policy of the policy data unit and implementing it by the central operating unit during the step of executing the schema.

According to at least one example embodiment, the step of executing the schema by the central operating unit comprises applying the principle of least privilege in the access control for the automation modules.

Hereby, the operation is controlled such that only the particular automation module(s) necessary at the time (i.e., at a certain point in the schema) for carrying out the particular processing step is allowed to be accessed. That is, the central operating unit is only allowed to perform a certain specific task when fulfilling the access control policy.

According to at least one example embodiment, the access control policy is based on an attribute-based access control, ABAC.

Hereby, the access control policy, and the privilege associations, are based on attributes, which is well suited for privileging connecting the automation modules with the processing steps. In other words, the model used for access control is ABAC. As an alternative to the attribute-based access control, other types of identifiers can be assigned to the processing steps and/or automation modules, for example based on roles or access control lists, ACL.

According to at least one example embodiment, the method further comprises:
assigning each processing step with an attribute of a first type;
assigning each automation module with an attribute of a second type;
wherein the step of generating privilege associations for each processing step comprises privileging each specific task with a first type attribute and a second type attribute.

By assigning attributes to the articles (automation modules and processing steps), the privilege associations can easily be set up based on the attributes. In other words, privileges to execute operations are modeled as associations between attributes of the first and second types. For example, the first type association may be a subject association, and the second type association may be an object association.

According to at least one example embodiment, the principle of least privilege is embodied by utilizing said attributes.

According to at least one example embodiment, the step of generating privilege associations, comprises associating a respective first type attribute with a second type attribute by the specific task needed to carry out the particular processing step. Naturally, more than one automation modules, and more than one specific task, may be included to carry out a processing step. Moreover, more than one specific task may be included in one privilege association.

According to at least one example embodiment, the method further comprising assigning each attribute with a policy class.

By assigning each attribute to a specific policy class, a grant for a privilege, for example a grant for performing a specific task of a particular automation module (first type attribute) in a certain processing step (second type attribute), may be given only if the attributes are assigned to the same policy class.

According to at least one example embodiment, the schema is a sequential function chart, SFC.

This provides a well-defined and suitable set-up for describing, and discretizing, the various processing steps. For such embodiments, the automation modules typically comprise programmable logic controllers, PLC, based on the SFC or another programmable component configured to execute the schema. The PLC or programmable component may be configured to communicate to, and control, other assets within the modular automation system.

According to at least one example embodiment, the method further comprises the steps of:
deactivating a schema:
remove the privilege associations for the deactivated schema.

Hereby, the grant of privilege associations based on an inactive schemas are avoided, which further strengthens the access control policy. According to at least one example embodiment, a previous deactivated schema can be reactivated, whereby a new generation of privilege associations need to be performed.

According to at least one example embodiment, the generated access control policy is based on next generation access control, NGAC or eXtensible Access Control Markup Language, XACML.

This provides a well-defined and suitable set-up for describing, and presenting, the access control policy. Thus, according to at least one example embodiment, the method according to present invention may be formalized by an SFC model as input and with an NGAC graph with access privilege information as the resulting output.

According to at least one example embodiment, the automation modules may be rearranged in order to perform different common processes.

Stated differently, at least the step of generating an access control policy may be based on rearrangeable automation modules.

According to at least one example embodiment, said common process is a first common process and said schema is a first schema, and the at least two automation modules are operable according to a second common process corresponding to a second schema different to said first schema, wherein the method further comprises:
generating updated privilege associations for each processing step with one or more automation modules, based on said second schema;
generating an updated access control policy for the automation modules based on the updated privilege associations.

Thus, the method provides a dynamic and adaptable means for generating and managing an access control policy. Note that the specific tasks of each automation module may be the same in the first and second common process.

According to at least one example alternative embodiment, the same generated access control policy is used for the first and the second common process. For such example embodiment, as the access control policy is based on the privilege associations for each processing steps, the order of the processing steps may be varied without the need to change the access control policy. Thus, a versatile means for managing and generating access control is provided.

According to at least one example embodiment, as mentioned previously, each automation module may be a standardized autonomous module, e.g., MTPs. The MTPs can be dynamically combined and recombined to perform different collaborate operations, i.e., different common processes.

According to at least one example embodiment, each automation module is associated to a respective network pathway to access, or provide access to, the central operating unit. Thus, the automation units may be configured to communicate and cooperate with other network device(s) across the network.

According to one example embodiment, the method is a method for facilitating automation security for a modular automation system to mitigate unwanted intrusions or attacks from an associated network that may affect the automation modules.

According to at least a second aspect of the present invention, an automation security system for a modular automation system including at least two automation modules, wherein each automation module is associated with an operation or a set of operations for carrying out a specific task, is provided. The system comprising:
means for receiving a schema of a common process comprising at least the order of processing steps of the modular automation system, each processing step comprising one or more of the specific tasks of the automation modules;
a data unit configured to generate privilege associations for each processing step with one or more automation modules, based on said schema, and to generate an access control policy for the automation modules based on the privilege associations.

Effects and features of this second aspect of the invention are largely analogous to those described above in connection with the first aspect of the invention. Embodiments mentioned in relation to the first aspect of the invention are largely compatible with the second aspect of the invention, of which some are exemplified below, but for which the advantageous effects are not repeated again.

For example, the system further comprises
a central operating unit configured to communicate with each one of the automation modules and to execute the schema;

a policy data unit comprising the access control policy, wherein the central operating unit is adapted to execute the schema in accordance with access control policy.

According to at least one example embodiment, the access control to the automation modules is based on an attribute-based access control, ABAC.

According to at least one example embodiment, the schema is a sequential function chart, SFC, and the central operating unit is configured execute the SFC, and/or wherein the access control policy is based on next generation access control, NGAC or eXtensible Access Control Markup Language, XACML.

According to at least one example embodiment, the system is configured to upon deactivation of a schema, remove the privilege associations related to the deactivated schema.

According to at least one example embodiment, the central operating unit is adapted to execute the schema while utilizing the principle of least privilege in the access control for the automation modules.

According to at least one example embodiment, the system is configured for automation modules which may be rearranged in order to perform different common processes.

According to at least one example embodiment, said common process is a first common process and said schema is a first schema, and the at least two automation modules are operable according to a second common process corresponding to a second schema different to said first schema, and wherein the data unit is adapted to generate updated privilege associations for each processing step with one or more automation modules based on the second schema, and to generate an updated access control policy for the automation modules based on the updated privilege associations.

According to at least one example embodiment, the system is configured to carry out the method according to the first aspect of the invention.

Any standard or non-standard languages or policies mentioned in the present application are to be based on instructions valid on the date of priority of the present application. Further advantages and features of the present disclosure are disclosed and discussed in the following description and the accompanying drawings.

BRIEF DESCRIPTION OF THE DRAWINGS

These and other aspects of the present inventive concept will now be described in more detail, with reference to the appended drawings showing an example embodiment of the inventive concept, wherein.

DETAILED DESCRIPTION

In the following description, for purposes of explanation and not limitation, specific details are set forth such as particular components, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail.

Figure 1:
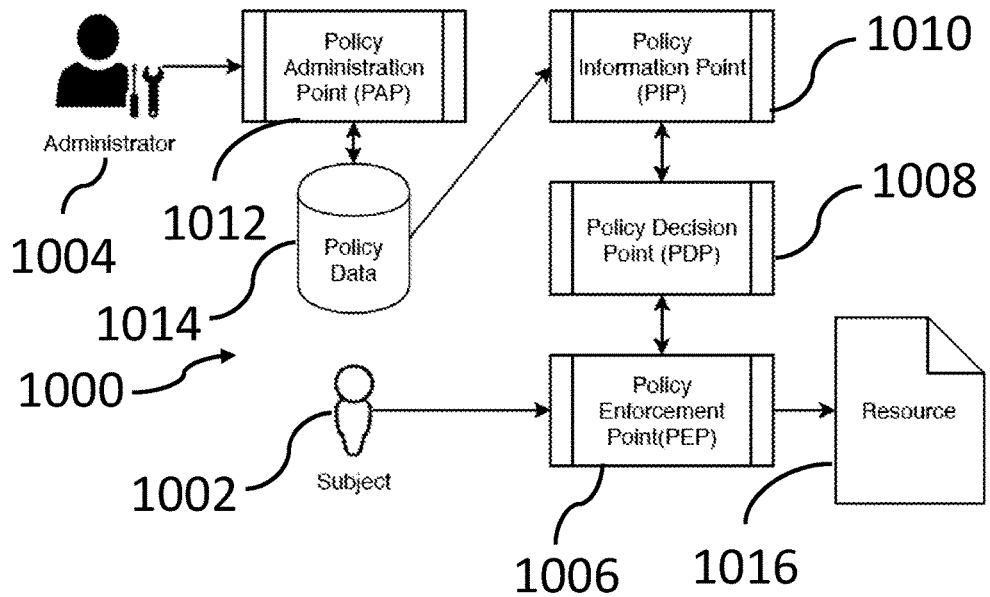
FIG. 1 schematically illustrates an access control architecture applicable to the present invention, FIG. 2 schematically illustrates an automation security system in accordance with an embodiment of the invention, FIG. 3 schematically illustrates another embodiment of the invention.

FIG. 1 schematically shows an access control architecture applicable to the present invention. In addition to the generation of access control model policies, policy enforcement is an important characteristic of an access control structure. FIG. 1 depicts a typical architecture 1000 that describes the entities involved in an access control enforcement architecture. The architecture 1000 in FIG. 1 comprises a subject 1002, an administrator 1004, a policy enforcement point, PEP, 1004, a policy decision point, PDP, 1008, a policy information point, PIP, 1010 and a policy administration point, PAP, 1012. Moreover, in FIG. 1, policy data 1014 and a resource 1016 are shown. The policy data 1014 may e.g., be comprised in a policy data unit as described below, and the resource 1016 may e.g., be one of the automation modules, also described below.

For the present access control mechanism to work properly, the only way for the subject 1002 to access the resource 1016 is through the policy enforcement point 1006. Therefore, the policy enforcement point 1006 is preferably kept physically close to the resource 1016, typically implemented on a device/unit in the resource 1016. In general, a privilege request is initiated by e.g., the subject 1002 and thereafter the policy enforcement point 1006, asks the policy decision point 1008 for a decision defining whether the request shall be granted or not. To answer the request, the policy decision point 1008 queries policy data 1014 through the policy information point 1010. Policy data 1014 is administered through the policy administration point 1012 by the administrator 1004. The actual placement and implementation of these policy interaction points 1006, 1008, 1010, 1012 are known to a skilled person, as it influences how well the access control mechanism functions and scales. Moreover, in the architecture 1000 of FIG. 1, a prerequisite for a secure access control is that identities of all involved entities can be trusted. Secure authentication of entities can be achieved using a number of methods known to the skilled person, including utilizing x.509 certificates. x.509 certificates are known to the skilled person as an International Telecommunication Union (ITU) standard defining the format of public key certificates. X.509 certificates are used in many Internet protocols, including TLS/SSL, which is the basis for HTTPS, the secure protocol for browsing the web. Wikipedia provides more information about the x.509 standard.

Figure 2:
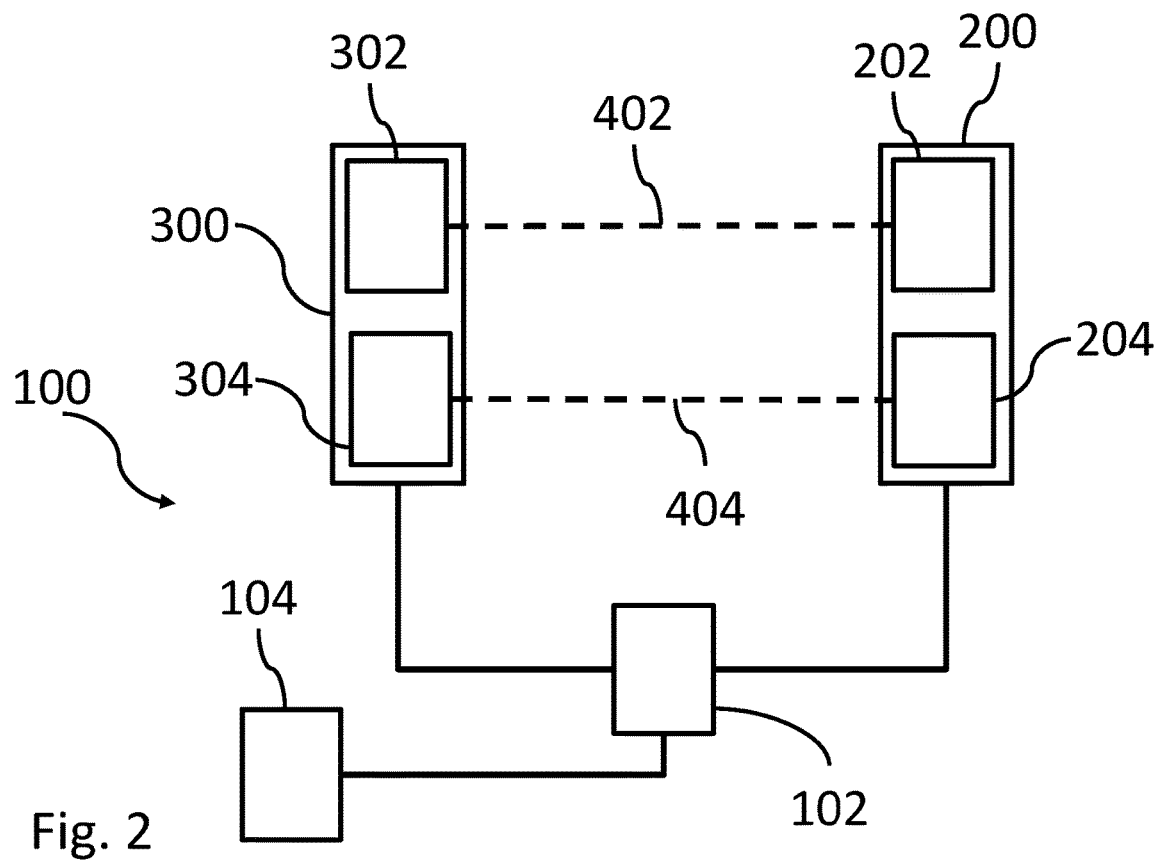
Figure 3:
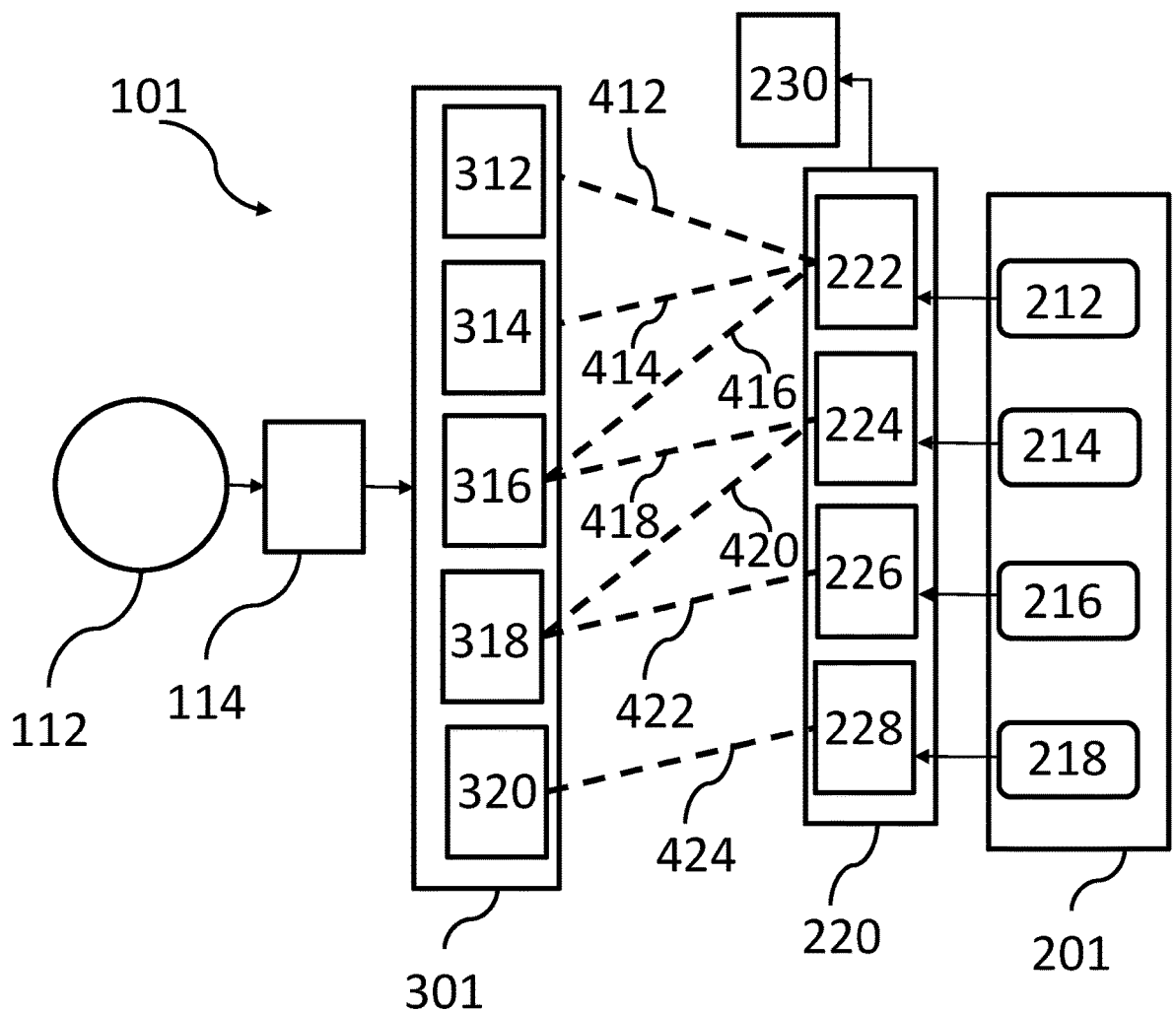

FIG. 2 schematically illustrates an automation security system 100 for a modular automation system 200. The modular automation system 200 in FIG. 2 comprises a first automation module 202 and as second automation module 204, wherein each one of the first and second automation modules 202, 204 is configured to carry out a specific task. Each specific task may in turn be built up by an operation, or a set of operations, performed by a device or devices within the respective module 202, 204. For example, the first automation module 202 may be configured to carry out a first specific task. In order to perform the first specific task, the first automation module 202 comprises a first device configured to carry out a first set of operations in order to fulfil the first specific task. Correspondingly, the second automation module 204 is configured to carry out a second specific task. Each one of the first and second automation module 202, 204 may be configured to carry out more than one specific task. The modular automation system 200 is configured to carry out a common process in which the first and second automation modules 202, 204 cooperates. Such common process typically comprises a plurality of processing steps, here a first processing step 302 and a second processing step 304 wherein each of the first and second processing steps 302, 304 comprises one or more of the specific tasks, here the first and second specific tasks, respectively. At least the order of the processing steps 302, 304 can be described in a workflow process scheme 300, here referred to as a schema 300 being a sequential function chart, SFC. In FIG. 3, the first processing step 302 is comprised of the first specific task, indicated by dashed line 402, carried out by the first automation module 202. However, it should be noted that the first processing step 302 may comprise more specific task, e.g., carried out by another automation module. Moreover, the second processing step 304 is comprised of the second specific task, indicated by dashed line 404, carried out by the second automation module 204. Correspondingly, it should be noted that the second processing step 304 may comprise more specific task, e.g., carried out by another automation module. In FIG. 3, the first processing step 302 is carried out prior to the second processing step 304.

The automation security system 100 comprises a central operating unit 102 configured to communicate with each one of the first and second automation modules 202, 204. Moreover, the central operating unit 102 is configured to execute the schema 300 of the common process of the modular automation system 200, as previously described, and thus configured to execute the SFC. The automation security system 100 further comprises a data unit 104 or data unit arrangement 104 configured to generate privilege associations for each processing step 302, 304 with the automation modules 202, 204, based on the schema 300, and to generate an access control policy for the automation modules 202, 204 based on these privilege associations (described in further detail in FIG. 3 and FIG. 4). The data unit 104 or data unit arrangement 104 typically comprises a data policy unit comprising at least the generated access control policy. The central operating unit 102 is adapted execute the schema 300 by accessing the automation modules 202, 204, in accordance with the access control policy of the data unit 104. Note that the data unit 104 may include one or more of the PEP 1004, PDP 1008, PIP 1010 and PAP 1012 of FIG. 1. Alternatively, the automation modules 202, 204 may communicate with the PEP and further to verify that an action requested by the central operating unit 102 falls within the access control policy.

According to at least one example embodiment, the first processing step 302 and the first specific task 402 is performed prior to the second processing step 304 and the second specific task 404, according to a first schema 300. Thus, the first automation module 202 is activated prior to the second automation module 204. However, the order of the processing steps 302, 304 may be changed, and the second processing step 304 may be carried out prior to the first processing step 302, according to a second schema. For such embodiments, the central operating unit 102 is configured to execute the first schema prior and is configured to execute the second schema. Typically, when a new schema is introduced in the system, here the second schema, the access control policies is automatically updated based on the new schema. For some cases, the same access control policy can be used when executing both the first schema and the second schema.

The number of automation modules, and processing steps, shown is exemplifying. It should be realized that there may be more automation modules in the automation module system, as well as more processing steps (but also fewer). However, all automation modules in the automation module system are members of a common collaborative group, i.e., a group collaborating in performing the common process, such as e.g., for producing a product.

In FIG. 3, schematically illustrates another embodiment of the invention. In FIG. 3, an access control policy 101 and the modular automation system 201 are described as an NGAC policy using attributes, e.g., ABAC, assigned to the different entities. Hence, the access control to the automation modules 212, 214, 216, 218 in FIG. 3 is based on an attribute-based access control, and the access control policy is based on NGAC.

The access control policy 101 of FIG. 3 are described with reference to an example of a modular automation system 201 for producing a specific product. In more detail, the modular automation system 201 comprises a first automation module 212, here being a reactor, a second automation module 214, here being a distiller, a third automation module 216, here being a filter, and a fourth automation module 218, here being a packaging unit. The common process, or here overall process, of the modular automation system 201 can be described according to the following schema:

1) The reactor 212 is filled with three different material in a specific ratio;
2) The reactor 212 mixes and heats the mixture, and maintains a fixed temperature for a specified amount of time;
3) The resulting mixture is distilled by the distiller 214;
4) The distillate is further purified by the filter 216;
5) The final product discharged from the filter 216 is packaged into a container by the packaging unit 218.

The above schema can be executed by a central operating unit 102 in a corresponding manner as described with reference to FIG. 2.

Figure 4:
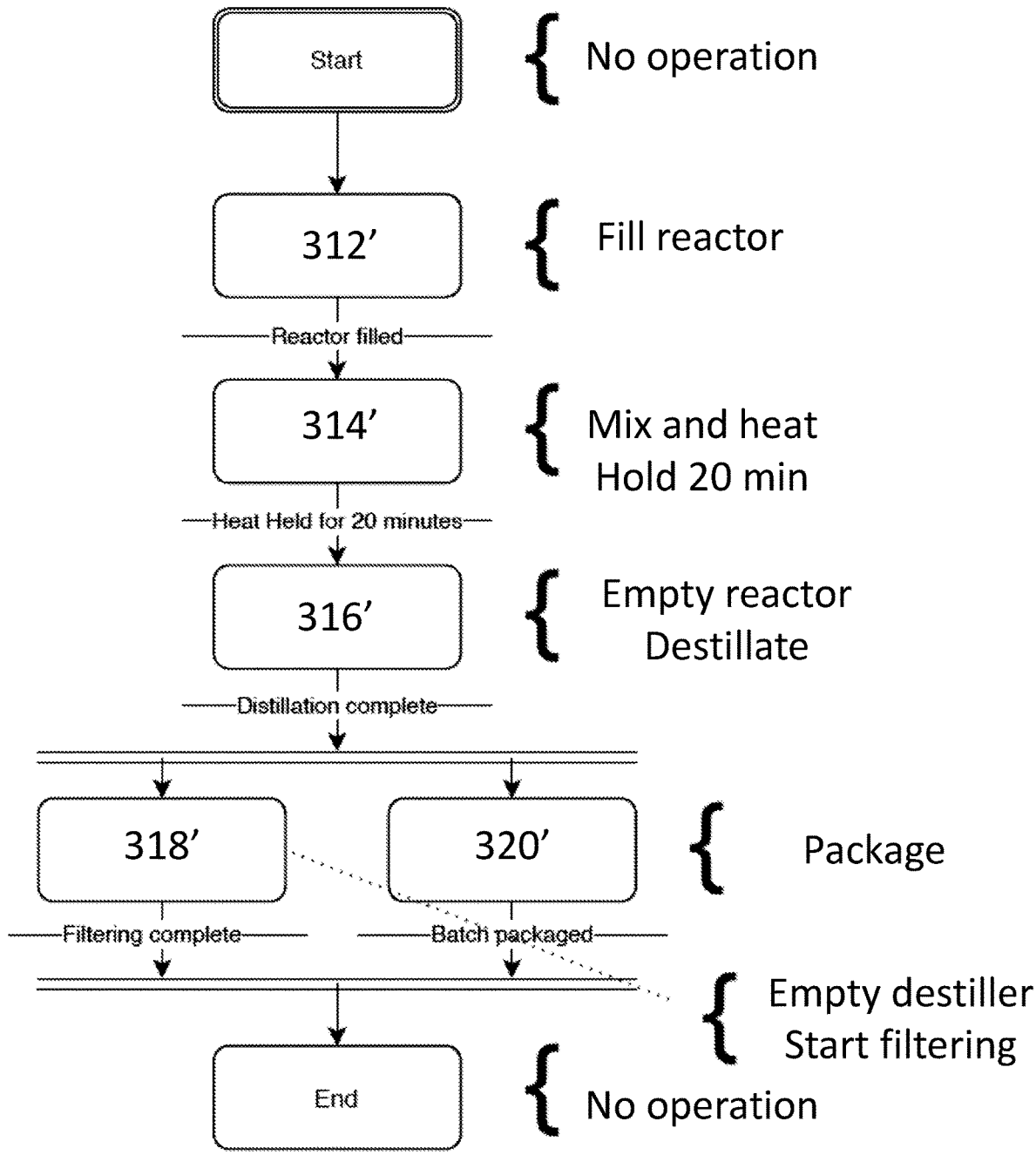
FIG. 4 illustrates a sequential functional chart, SFC, applicable to the present invention.

The above schema can be described using SFC, as shown in FIG. 4, together with refence to the automation modules in FIG. 3. An SFC typically comprises processing steps and transitions. Each processing step in the schema describes the specific task(s) or operations relevant to perform in that particular processing step. Moreover, each processing step contains zero or more outward directed transitions, shown in FIG. 4 as arcs describing the conditions for continuing to the next processing step(s). That is, the arc represents a transition point to one or more subsequent processing steps. In the case of more than one processing step, the following processing steps are executed in parallel as soon as the condition annotated on the transition enabling that processing step is fulfilled. To join a parallel execution, two (or more) edges point to the same processing step. In such join-cases, conditions for all edges pointing at the same processing step must be fulfilled for it to be triggered. It should be noted that an SFC may contain loops (not shown in FIG. 4).

The SFC begins with a simple start operation in which no operation is active. Subsequently, the reactor 212 is filled according to first processing step in the above schema, here represented by step 312'. Next, as the condition of filling the reactor is met, the reactor 212 mixes and heats the mixture according to the second processing step in the above schema, here represented by step 314'. Correspondingly, when the condition for step 314' is met, the process continues with emptying the reactor 212 and begin with distillation according to the third processing step in the above schema, here represented by step 316'. When the distillation is completed (i.e., condition for step 316' fulfilled), the two subsequent processing steps in the schema above, i.e., the fourth and fifth processing steps, here represented by the step 318' (filtration) and step 320' (packaging), respectively, can be carried out in parallel. In more detail, in step 318', the filter 216 filters the distillate from step 316', and in step 320', the packaging unit 218 packages the final product. Thus, it should be understood that step 318' and step 320' can be executed in parallel, i.e., the packaging 320' can start as soon as there is a sufficient amount of the final product available. The SFC ends with and end operation in which no operation is active.

Returning to FIG. 3, each of the automation modules 212, 214, 216, 218, commonly gathered in box 201, are assigned with a module attribute 230. In more detail, the reactor 212 is assigned a reactor attribute 222, the distiller 214 is assigned a distiller attribute 224, the filter 216 is assigned a filter attribute 226 and the packaging unit 218 is assigned a packaging unit attribute 228.

Correspondingly, each of the processing steps in the schema 301, here referring to the processing steps 312', 314', 316', 318', 320' described with reference to FIG. 4, is assigned with a processing step attribute. In more detail, the processing step 312' is assigned with first processing step attribute 312, the processing step 314' is assigned with second processing step attribute 314, the processing step 316' is assigned with third processing step attribute 316, the processing step 318' is assigned with fourth processing step attribute 318, and the processing step 320' is assigned with fifth processing step attribute 320. Also, the central operating unit 112 is assigned a central operating unit attribute 114.

Moreover, specific tasks, or operations, of the automation modules 212, 214, 216, 218 which are carried out to perform the processing steps 312', 314', 316', 318', 320' are indicated by dashed lines connecting the processing step attributes, 312, 314, 316, 318, 320 with the module attributes 222, 224, 226, 228. In more detail, the first processing step attribute 312 is connected to the reactor attribute 222 by the specific task of filling 412 the reactor 212, the second processing step attribute 314 is connected to the reactor attribute 222 by the specific task of mixing and heating the mixture 414 in the reactor 212, the third processing step attribute 316 is connected to the reactor attribute 222 by the specific task of emptying 416 the reactor 412, and is connected to the distiller attribute 224 by the specific task of distilling 418 in the distiller 212, the fourth processing step attribute 318 is connected to the distiller attribute 224 by the specific task of emptying 420 the distiller 214, and is connected to the filter attribute 226 by the specific task of filtering 422 by the filter 216, the fifth processing step attribute 320 is connected to the packaging unit attribute 228 by the specific task of packaging 424 by the packaging unit 228 (e.g., filling bottles with the final product).

Each combination of processing step attribute, module attribute and interconnected specific task or operation as present above may be described as a privilege association in the access control policy. For example, a first privilege association of the first processing step attribute 312 and the reactor attribute 222 by the specific task of filling 412 the reactor 212, may be comprised in the access control policy. Another example is a second privilege association of the second processing step attribute 314 and the reactor attribute 222 by the specific task of mixing and heating the mixture 414 in the reactor 212. Further privilege associations can be described based on each combination of processing step attribute, module attribute and interconnected specific task or operation.

It should be noted that instead of using NGAC, the access control policy may be based on another standard or language, e.g., extensible Access Control Markup Language, XACML.

The invention will now be described with reference to the flow chart in FIG. 5. The flow chart schematically illustrates the steps of a method for managing access control within a modular automation system, as the modular automation system 200 in FIG. 2 or modular automation system 201 in FIG. 3. Thus, the modular automation system comprises at least two automation modules, wherein each automation module is associated with an operation or a set of operations for carrying out a specific task.

In step 501, a schema of a common process comprising at least the order of processing steps of the modular automation system is received. The schema may e.g., be the schema 300 of FIG. 2, or schema 301 of FIG. 3 (representing the SFC described with reference to FIG. 4). Thus, each processing step comprises one or more of the specific tasks of the automation modules. Preferably, the schema is a sequential function chart, SFC. The step 501 may be implemented by any suitable means, e.g., comprised in data unit 104 or data unit arrangement 104 of FIG. 2.

In step 503, privilege associations for each processing step with one or more automation modules, based on said schema, are generated. The privilege associations may e.g., be generated as described with reference to FIG. 3.

In step 505, an access control policy for the automation modules based on the privilege associations are generated. The access control policy may e.g., be similar to the access control policy 101 of FIG. 3. Such access control policy may be comprised in the policy data 1014 of FIG. 1 and stored in a data unit 104 shown in FIG. 2. Hence, the generated access control policy may be based on next generation access control, NGAC.

For embodiments in which a central operating unit is configured to communicate with each one of the automation modules, such as central operating unit 102, 112 (in FIGS. 2 and 3) the method may comprise the step 507 of executing the schema received in step 501 by the central operating unit in accordance with the generated access control policy of step 505.

According to at least one example embodiment, the step 507 comprises applying the principle of least privilege in the access control for the automation modules. In other words, the execution of the common process is controlled such that only the particular automation module attribute(s) necessary at the time for fulfilling the specific task in the particular processing step (i.e., at a certain point in the schema) is allowed to be accessed. That is, the central operating unit is only allowed to perform a certain specific task at a time in accordance with the schema, when fulfilling the access control policy. The principle of least privilege may be implemented in the access control policy. Thus, for the embodiments shown in FIG. 2 and FIG. 3, the central operating units 102, 112 are operated based on the principle of least privilege in the access control for the automation modules during execution of the schema 300, 301.

Step 503 and/or step 505 may be carried out by utilizing an attribute-based access control, ABAC, as described with reference to FIG. 3, and may be generated by the data unit 104 of FIG. 2. Thus, the method may comprise the step 502A of assigning each processing step with an attribute of a first type, i.e., a processing step attribute (as attributes 312, 314, 316, 318, 320 in FIG. 3), and step 502B of assigning each automation module with an attribute of a second type, i.e., a module attribute (as attributes 222, 224, 226, 228 in FIG. 3). Hereby, the step 503 may comprise privileging each specific task with a first type attribute and a second type attribute.

Figure 5:
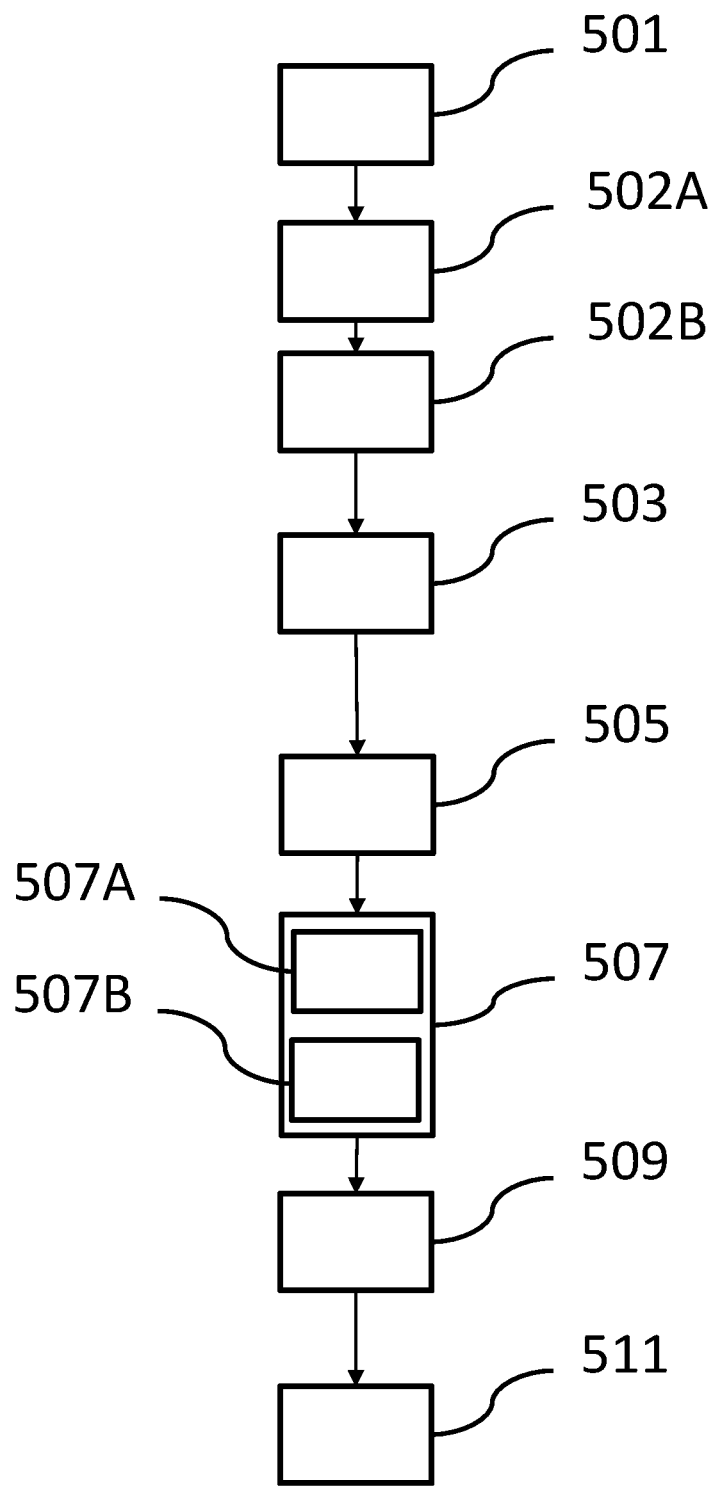
FIG. 5 is a flow chart describing the steps according to an example embodiment of the invention.

Optionally, the method of FIG. 5 comprises the step 509 of deactivating a schema, and step 511 of removing the privilege associations for the deactivated schema (i.e., the privilege associations generated in step 503). Thus, for the embodiments shown in FIG. 2 and FIG. 3, the central operating units 102, 112 are configured to upon deactivation of a schema, remove the privilege associations related to the deactivated schema.

Optionally, the method in FIG. 5 is applied to an automation module system in which the automation modules is rearrangeable in order to perform different common processes, as described with reference to FIG. 2. Thus, the common process may be referred to as a first common process, and the schema may be referred to as a first schema, and the at least two automation modules may operable according to a second common process corresponding to a second schema different to the first schema. Thus, the method may comprise the step 507A of executing the first schema, and the step 507B of executing the second schema. For the second schema, the steps 501, 503 and 505 are typically repeated to generate an updated access control policy for the second schema. Such update may be carried out by utilizing data unit 104.

It should be understood that the method described with reference to FIG. 5, or at least some of the steps of the method, may be implemented in one or more control units of an automation security system or modular automation system, such as e.g., data unit 104.

The above-mentioned functionality of the entities be implemented using hardware and software resources known to the skilled person, e.g., associated hardware resources such as e.g., processing units being provided in the form of one or more processors together with process software including computer program memory including computer program code for performing its function. As an alternative it may be provided in the form of an Application Specific Integrated Circuit (ASIC) or Field-Programmable Gate Array (FPGA). This computer program code may also be provided on one or more data carriers which perform the functionality of the entities when the program code thereon is being loaded in a processing entity. One such data carrier with computer program code, is in the form of a CD ROM disc. Such computer program may as an alternative be provided on a server and downloaded therefrom into the processing entity in question.

Therefore, while the invention has been described in connection with what is presently considered to be most practical and preferred embodiments, it is to be understood that the invention is not to be limited to the disclosed embodiments, but on the contrary, is intended to cover various modifications and equivalent arrangements. Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for managing access control within a modular automation system including at least two automation modules, wherein each automation module is associated with an operation or a set of operations for carrying out a specific task, the method comprising:
   receiving a schema of a common process including at least the order of processing steps of the modular automation system, each processing step having one or more of the specific tasks of the automation modules;
   generating privilege associations for each processing step with one or more automation modules, based on said schema;
   generating an access control policy for the automation modules based on the privilege associations, such that access is only allowed based on the privileged associations.

2. The method according to claim 1, wherein the modular automation system comprises a central operating unit configured to communicate with each one of the automation modules, and wherein the method further includes the step of:
   executing the schema by the central operating unit in accordance with the generated access control policy.

3. The method according to claim 2, wherein the step of executing the schema by the central operating unit includes applying the principle of least privilege in the access control for the automation modules.

4. The method according to claim 1, wherein the access control policy is based on an attribute-based access control, ABAC.

5. The method according to claim 1, wherein the schema is a sequential function chart, SFC.

6. The method according to claim 1, further comprising the steps:
   deactivating a schema:
   remove the privilege associations for the deactivated schema.

7. The method according to claim 1, wherein the generated access control policy is based on next generation access control, NGAC or eXtensible Access Control Markup Language, XACML.

8. The method according to claim 1, wherein the automation modules may be rearranged in order to perform different common processes.

9. The method according to claim 8, wherein said common process is a first common process and said schema is a first schema, and the at least two automation modules are operable according to a second common process corresponding to a second schema different to said first schema, wherein the method further comprises:
   generating updated privilege associations for each processing step with one or more automation modules, based on said second schema;
   generating an updated access control policy for the automation modules based on the updated privilege associations.

10. An automation security system for a modular automation system including at least two automation modules, each automation module being associated with an operation or a set of operations for carrying out a specific task, the system comprising:
    means for receiving a schema of a common process including at least the order of processing steps of the modular automation system, each processing step having one or more of the specific tasks of the automation modules;
    a data unit configured to generate privilege associations for each processing step with one or more automation modules, based on said schema, and to generate an access control policy for the automation modules based on the privilege associations, such that access is only allowed based on the privileged associations.

11. The system according to claim 10 further comprising:
a central operating unit configured to communicate with each one of the automation modules and to execute the schema;
a policy data unit including the access control policy, wherein the central operating unit is adapted to execute the schema in accordance with access control policy.

12. The system according to claim 10, wherein the access control to the automation modules is based on an attribute-based access control, ABAC.

13. The system according to claim 10, wherein the schema is a sequential function chart, SFC, and the central operating unit is configured execute the SFC, and/or wherein the access control policy is based on next generation access control, NGAC or eXtensible Access Control Markup Language, XACML.

14. The system according to claim 10, wherein the system is configured to upon deactivation of a schema, remove the privilege associations related to the deactivated schema.

15. The system according to claim 10, wherein said common process is a first common process and said schema is a first schema, and the at least two automation modules are operable according to a second common process corresponding to a second schema different to said first schema, and wherein the data unit is adapted to generate updated privilege associations for each processing step with one or more automation modules based on the second schema, and to generate an updated access control policy for the automation modules based on the updated privilege associations.

16. The system according to claim 10, wherein the system is configured to carry out a method including the steps of:
receiving a schema of a common process including at least the order of processing steps of the modular automation system, each processing step including one or more of the specific tasks of the automation modules;
generating privilege associations for each processing step with one or more automation modules, based on said schema; and
generating an access control policy for the automation modules based on the privilege associations.

* * * * *